United States Patent [19]

Meichsner et al.

[11] Patent Number: 5,494,964
[45] Date of Patent: Feb. 27, 1996

[54] POLYESTERS BASED ON HYDROXYL-CONTAINING PREPOLYMERS OF OLEFINICALLY UNSATURATED MONOMERS AND THEIR USE AS BINDERS FOR ELECTROPHOTOGRAPHIC TONERS

[75] Inventors: Georg Meichsner, Ludwigshafen; Thomas Wuensch, Bad Durkheim; Rainer Dyllick-Brenzinger, Weinheim, all of Germany

[73] Assignee: BASF Aktiengesellschaft, Ludwigshafen, Germany

[21] Appl. No.: 307,790

[22] PCT Filed: Mar. 23, 1993

[86] PCT No.: PCT/EP93/00696

§ 371 Date: Sep. 30, 1994

§ 102(e) Date: Sep. 30, 1994

[87] PCT Pub. No.: WO93/20129

PCT Pub. Date: Oct. 14, 1993

[30] Foreign Application Priority Data

Apr. 3, 1992 [DE] Germany ............... 42 11 062.9

[51] Int. Cl.⁶ .............. C08G 63/48; G03G 9/00
[52] U.S. Cl. .............. 525/10; 528/176; 528/179; 528/189; 528/192; 528/194; 528/205; 528/219; 528/272; 528/288; 528/302; 528/306; 528/308.6; 525/165; 525/178; 525/179; 525/420; 525/425; 525/437; 525/438; 525/445; 430/109
[58] Field of Search ............... 528/176, 179, 528/189, 192, 194, 205, 219, 272, 288, 302, 306, 308.6; 525/420, 425, 437, 438, 445, 10, 165, 178, 179; 430/109

[56] References Cited

U.S. PATENT DOCUMENTS 4,657,837 4/1987 Morita et al. ............ 430/109

4,980,448 12/1990 Tajiri et al. ............ 528/194

FOREIGN PATENT DOCUMENTS 0195604 9/1986 European Pat. Off. .

*Primary Examiner*—Samuel A. Acquah
*Attorney, Agent, or Firm*—Oblon, Spivak, McClelland, Maier & Neustadt

[57] ABSTRACT

Polyester resins suitable as binders for electrophotographic toners and for acceptor layers for the thermal diffusion printing process based on hydroxyl-containing prepolymers of olefinically unsaturated monomers obtained by (1) polymerization of a mixture of
(a) from 60 to 90% by weight of styrene or of a styrene derivative,
(b) from 0 to 40% by weight of one or more $C_1$–$C_{12}$-alkyl esters of acrylic or methacrylic acid, acrylonitrile or methacrylonitrile, acrylamide or methacrylamides, maleic anhydride or maleimide,
(c) from 0 to 20% by weight of one or more hydroxyl-containing acrylic or methacrylic acid derivatives, and
(d) from 0 to 2% by weight of one or more polyolefinically unsaturated monomers, to give the prepolymer A, the hydroxyl groups being incorporated in A by using hydroxyl-containing regulators if the monomer component (c) is absent, and subsequently (2) polycondensation of a mixture of
A) from 5 to 95% by weight of the prepolymer A,
B) from 0 to 95% by weight of a further polyol, of a polyester or of a polyamide or a mixture thereof and
C) from 5 to 70% by weight of one or more aliphatic or aromatic dicarboxylic acids C or $C_1$–$C_4$-alkyl esters thereof.

12 Claims, No Drawings

POLYESTERS BASED ON HYDROXYL-CONTAINING PREPOLYMERS OF OLEFINICALLY UNSATURATED MONOMERS AND THEIR USE AS BINDERS FOR ELECTROPHOTOGRAPHIC TONERS

The present invention relates to novel polyester resins based on hydroxyl-containing prepolymers of olefinically unsaturated monomers and their use as binders for electrophotographic toners. The present invention furthermore relates to electrophotographic toners containing these polyester resins as binders.

Electrophotographic toners have to meet a large number of requirements which arise from the copying process, toner production or the handling of the toners. Many of the requirements which a toner has to meet are determined by the binder, ie. by the toner resin.

Thus, a toner resin must be capable, for example, of readily dispersing additives such as carbon black, ferrites, magnetite, Aerosil, charge stabilizers and waxes. Homogeneous dispersing is necessary since otherwise toner particles having very different electrostatic properties may be present.

Another requirement is good millability of the toner resin. In toner production, reverse-jet mills are generally used. Some resins give toners which require very long times before they can be brought to the desired particle size, preferably from 5 to 15 μm, in a reverse-jet mill. Another frequent problem in milling in the reverse-jet mill is the production of fine dust, ie. of particles which have a particle size which is less than 5 μm.

The shelf life of a toner is also influenced by the toner resin. A resin which becomes soft at room temperature or at the temperatures prevailing in the copier and can stick together gives toner powders which can cake and are no longer free-flowing. Caking of the toner powder may also occur if a moisture-sensitive resin which is even only slightly hygroscopic is used. In addition, resins which absorb moisture from the surrounding air lead to toners whose electrostatic properties are greatly dependent on the atmospheric humidity. The consequences are the occurrence of background and irregular blackening in solid areas on the copy.

A further problem is the increase in the fixing rate of an image transferred to the print medium (acceptor) by heat, ie. the increase in the cycle time of the copier. The properties of a toner during fixing are greatly influenced by the melting behavior of the toner resin. A higher fixing rate is achieved by using a resin having a low softening point. However, this may result in the problem of hot offset, ie. some of the molten toner remains adhering to the hot fixing roller of the copier and is transferred to subsequent copies.

In U.S. Application No. 4,657,837 (1), the problem of hot offset is solved by using a branched polyester of terephthalic acid, trimellitic acid and ethoxylated or propoxylated bisphenol A. Toners consisting of this resin have very good anti-offset properties but, owing to their high softening point, are unsuitable for copiers having cycle times of more than 50 copies per minute, since adequate fixing on the print medium (acceptor) is not achieved.

Polyesters having a lower softening point but poorer anti-offset properties are described in U.S. Aapplication No. 4,980,448 (2). These polyesters are obtainable by reacting a dicarboxylic acid component, a diol component and a crosslinking agent. However, in the preparation of these resins there is a danger that excessive crosslinking may occur in the polycondensation.

EP-195 604 (3) discloses polyesters for use in toner mixtures, which are obtainable by copoly-condensation of a diol component of ethoxylated or propoxylated bisphenol A with a copolymer of styrene or a styrene derivative and a carboxyl-containing vinyl monomer. These polyesters, too, do not solve the prior art problems described.

Toner resins which have a very high viscosity after melting or which melt only very slowly exhibit the phenomenon of cold offset, ie. toner particles are not correctly fixed on the paper and may therefore remain adhering to the fixing rollers. The literature frequently describes the use of resins having a bimodal molecular weight distribution, which avoid cold and hot offset. This can also be achieved by using resin mixtures or resins having a broad molecular weight distribution. Thus, the low molecular weight fraction ensures good melting of the binder and good fixing on the paper, and the higher molecular weight fraction ensures a sufficiently high viscosity of the binder and imparts to the molten toner a certain cohesion which prevents hot offset.

The electrostatic chargeability of toner resins is also important. The charge build-up can be controlled by means of charge stabilizers. Another important criterion is the stability of the charge. Many toners have a tendency of building up too much charge during the development process. The charge stabilizer keeps the charge at a very particular level, and very uniform blackness of the copies is thus obtained. In this context, the reaction between charge stabilizer and toner resin is the critical parameter.

It is an object of the present invention to remedy the prior art deficiencies described. It was therefore intended to provide a toner resin which can be produced particularly easily and without problems, has good dispersing properties, is readily millable and has a long shelf life as well as good cold and hot offset properties in conjunction with a high fixing rate.

We have found that this object is achieved by polyester resins based on hydroxyl-containing prepolymers of olefinically unsaturated monomers, which are obtainable by
(1) polymerization of a mixture of
(a) from 60 to 90% by weight of styrene or of a styrene derivative of the general formula I

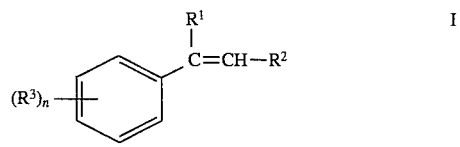

where $R^1$, $R^2$ and $R^3$ are each hydrogen, methyl or ethyl and n is 1 or 2, or of a $C_2$–$C_{10}$-olefin having one or two conjugated double bonds, or of a mixture thereof,
(b) from 0 to 40% by weight of a $C_1$–$C_{12}$-alkyl ester of acrylic or methacrylic acid, acrylonitrile or methacrylonitrile, acrylamide or methacryl-amide which may be substituted by one or two $C_1$–$C_4$-alkyl groups on the amide nitrogen, maleic anhydride or maleimide which may be substituted by $C_1$–$C_4$-alkyl on the imide nitrogen, or a mixture thereof,
(c) from 0 to 20% by weight of one or more hydroxyl-containing acrylic or methacrylic acid derivatives, and
(d) from 0 to 2% by weight of one or more poly-olefinically unsaturated monomers, to give the prepolymer A, the hydroxyl groups being incorporated in A by using hydroxyl-containing regulators when the monomer component (c) is absent, and subsequently
(2) polycondensation of a mixture of
A) from 5 to 95% by weight of the prepolymer A,
B) from 0 to 95% by weight of a further low molecular weight or relatively high molecular weight polyol, of a polyester or of a polyamide or a mixture thereof and C) from 5 to 70% by weight of one or more aliphatic or aromatic dicarboxylic acids C or $C_1$–$C_4$-alkyl esters thereof, where carboxylic acids or $C_1$–$C_4$-alkyl esters thereof having more than two carboxyl groups in the molecule or monocarboxylic acids or $C_1$–$C_4$-alkyl esters thereof or hydroxymonocarboxylic acids or $C_1$–$C_4$-alkyl esters thereof, or a mixture of these, and waxes may also be present in the polycondensation.

In the styrene and styrene derivatives I serving as monomers (a) for the polymerization (1), $R^1$ is preferably hydrogen or methyl, $R^2$ and $R^3$ are each preferably hydrogen and n is preferably 1. If, when n=1, $R^3$ is methyl or ethyl, the phenyl nucleus is ortho-, meta- or, preferably, para-substituted. If, where n is 2, $R^3$ is methyl or ethyl, the substitution pattern on the phenyl nucleus is preferably 2, 4.

Further suitable monomers (a) for the polymerization (1) are straight-chain or branched $C_2$–$C_{10}$-olefins, such as ethylene, propylene, 1-butylene, 2-butylene, butadiene, isoprene, 1-pentene, 2-pentene, 3-pentene, 1-hexene, 2-hexene, 3-hexene, 2,4-hexadiene, heptenes, octenes, nonenes and decenes.

Preferred monomers (a) for the polymerization (1) are styrene, α-methylstyrene, ethylene, propylene, butadiene or a mixture thereof.

The $C_1$–$C_{12}$-alkyl acrylates and methacrylates which are suitable as monomers (b) for the polymerization (1) carry as a straight-chain or branched alcohol radical, for example methyl, ethyl, n-propyl, isopropyl, n-butyl, isobutyl, sec-butyl, tert-butyl, n-amyl, isoamyl, sec-amyl, tert-amyl, neopentyl, n-hexyl, n-heptyl, n-octyl, 2-ethylhexyl, n-nonyl, isononyl, n-decyl, n-undecyl or n-dodecyl. $C_1$–$C_4$-Alkyl acrylate and methacrylate are preferred among these. Suitable $C_1$–$C_4$-alkyl groups which may occur as substitutents on the amide nitrogen of acrylamide or methacrylamide and on the imide nitrogen of maleimide are the abovementioned groups.

$C_1$–$C_4$-alkyl esters of acrylic and methacrylic acid, acrylonitrile, methacrylonitrile, acrylamide and methacrylamide, or a mixture thereof, are preferred as monomers (b) for the polymerization (1). In particular, the methacrylic acid derivatives give outstanding results.

Particularly suitable hydroxyl-containing acrylic or methacrylic acid derivatives (c) for the polymerization (1) are hydroxy-$C_2$–$C_4$-alkyl acrylates or methacrylates, eg. 2-hydroxyethyl acrylate, 2-hydroxyethyl methacrylate, 2- or 3-hydroxypropyl acrylate, 2- or 3-hydroxypropyl methacrylate, 4-hydroxybutyl acrylate or 4-hydroxybutyl methacrylate, N-(hydroxy-$C_2$–$C_4$-alkyl)-acryl-amides or -methacrylamides, eg. N-(2-hydroxyethyl)-acryl-amide, N-(2-hydroxyethyl)-methacrylamide, N-(4-hydroxy-butyl)-acrylamide or N-(4-hydroxybutyl)-methacrylamide, or mixtures thereof. However, N-(hydroxy-$C_2$–$C_4$-alkyl)-maleimides, eg. N-(2-hydroxyethyl)-maleimide, hydroxyl-containing styrene derivatives, eg. ortho-, meta- or para-hydroxystyrene or ortho-, meta- or para- (hydroxy-methyl)-styrene or alkenols, eg. but-2-en-1-ol or prop-2-en- 1-ol (allyl alcohol), are also suitable.

Particularly suitable polyolefinically unsaturated monomers (d) are those having from 2 to 5 vinyl or allyl groups in the molecule, for example glycol di(meth)acrylate, butanediol di(meth)acrylate, glyceryl tri(meth)acrylate, (meth)allyl (meth)acrylate, penta-erythrityl triallyl ether, pentallylsucrose, di(meth)-acrylates of polyethylene glycols having a molecular weight of up to 3,000, divinyldioxane and especially divinylbenzene. If desired, the properties of the prepolymers A can be modified within certain limits by these monomers acting as crosslinking agents.

If monomer component (c) is absent, a hydroxyl-containing regulator is used in the polymerization (1) in order to incorporate the necessary hydroxyl groups into the prepolymer A. These regulators are used in the conventional amounts, eg. from about 0.1 to 5, in particular from 0.3 to 2, % by weight, based on the total amount of the monomers (a) and (b).

Particularly suitable hydroxyl-containing regulators are hydroxyl-containing mercaptans, eg. 2-hydroxy-ethyl mercaptan (2-mercaptoethanol), 1-mercapto-2,3-propanediol, 3-mercaptopropanol, 4-mercaptobutanol, 2-hydroxyethyl mercaptoacetate or 2-hydroxyethyl 3-mercaptopropionate. The best results are obtained with 2-mercaptoethanol.

In a preferred embodiment, a mixture of from 65 to 85% by weight of monomers (a), from 0 to 35% by weight of monomers (b), from 0 to 15% by weight of monomers (c) and from 0 to 0.5% by weight of monomers (d) are used in the polymerization (1).

The prepolymer A can be prepared by suspension, solution or block polymerization according to the conventional methods. In the subsequent polycondensation (2), however, prepolymers A prepared by solution polymerization are preferably used since the polymerization (1) and the polycondensation (2) can then be carried out in succession in one reaction vessel because isolation of a prepolymer is dispensed with.

In a suspension polymerization, a mixture of water and a water-miscible organic solvent, eg. a water/ethanol mixture or water/isopropanol mixture having a low alcohol content, or in particular water alone, is advantageously used as the suspending medium. For example, polyvinylpyrrolidone is used as a protective colloid.

In solution polymerization, advantageously used solvents are inert organic solvents, in particular aliphatic or aromatic hydrocarbons, eg. toluene, xylene, cyclohexane, methylcyclohexane, petroleum ether or naphtha. However, halohydrocarbons, eg. chloroform, are also suitable.

The polymerization (1) is advantageously carried out as a free radical polymerization, suitable free radical initiators being, for example, benzoyl peroxide or tert-butyl peroctanoate. A suitable polymerization temperature is from 60° to 130° C., in particular from 80° to 120° C. In solution polymerization, it is advantageous to use evaporative cooling.

The average molecular weight $M_n$ of the prepolymer A should be from 800 to 40,000, in particular from 800 to 15,000. The OH number of A should be less than 60, in particular less than 50, mg of KOH/g. Solution polymers A having OH numbers of from 1 to 16 mg of KOH/g and a ratio of components A to B of more than 40:60 are preferred in the polycondensation (2). If the ratio of A to B in the polycondensation (2) is less than 40:60, polymers A having OH numbers greater than 10 mg of KOH/g may also advantageously be used.

Particularly suitable components B for the polycondensation (2) are $C_2$–$C_6$-alkanediols, eg. ethylene glycol, 1,2- and 1,3-propanediol, 1,4-butanediol, 1,6-hexanediol, neopentylglycol, ethoxylated or propoxylated bisphenol A, for example bisphenol A reacted with from 2 to 20 mol of ethylene oxide or propylene oxide, or mixtures thereof. However, high molecular weight polyols having an average molecular weight $M_n$ of more than 500, for example polyesterdiols, polyetherdiols or polycarbonatediols, polyesters, such as polycaprolactone or polyamides, such as polycaprolactam, may also be used.

Particularly suitable dicarboxylic acids C for the polycondensation (2) are phthalic acid, isophthalic acid, terephthalic acid or their $C_1$–$C_4$-monoalkyl esters and in particular $C_1$–$C_4$-dialkyl esters or a mixture thereof. However, for example cyclohexanedicarboxylic acids or aliphatic dicarboxylic acids such as succinic acid or adipic acid or the corresponding $C_1$–$C_4$-monoalkyl esters and in particular $C_1$–$C_4$-dialkyl esters may also be used.

A mixture of from 5 to 95% by weight of the prepolymer A, from 0 to 95% by weight of the component B and from 5 to 70% by weight of the dicarboxylic acid C or an ester thereof are used in the polycondensation (2), A and B together accounting for from 30 to 95% by weight of this mixture. In a preferred embodiment, a mixture of from 30 to 70% by weight of A, from 10 to 50% by weight of B and from 10 to 50% by weight of C is used, A and B together accounting for from 50 to 90% by weight of this mixture.

In the polycondensation (2), for example, tri-mellitic acid, benzoic acid, o- or p-hydroxybenzoic acid, nicotinic acid or stearic acid or the corresponding $C_1$–$C_4$-alkyl esters may be present as additional carboxylic acids, as well as waxes, for example polypropylene wax. These additional carboxylic acids or their esters are then present in amounts of up to 15% by weight, and the waxes in amounts of up to 15% by weight, based in each case on the total amount of the mixture of A, B and C.

Suitable $C_1$–$C_4$-alkanols in the carboxylic acid esters employed are n-propanol, isopropanol, n-butanol, sec-butanol, tert-butanol and in particular methanol and ethanol.

The water formed in the polycondensation (2) or the $C_1$–$C_4$-alkanol formed is advantageously distilled off directly from the resin melt if no entraining agent is present, or is removed by means of an entraining agent, such as toluene, xylene, methylcyclohexane or chloroform. The polycondensation is usually carried out in the presence of a catalyst, for example dibutyltin oxide, a titanium alcoholate, p-toluenesulfonic acid or sulfuric acid, in the conventional amounts.

The polycondensation (2) is carried out either so that the prepolymer A is added to the components B and C which have been precondensed to an OH number of less than 90 mg of KOH/g, or all three components A, B and C are added together simultaneously. The condensation is completed towards the end of the reaction at from 180° to 280° C.

The present invention furthermore relates to a process for the preparation of polyester resins based on hydroxyl-containing prepolymers of olefinically unsaturated monomers, wherein (1) a polymerization of a mixture of (a) from 60 to 90% by weight of styrene or of a styrene derivative of the general formula I

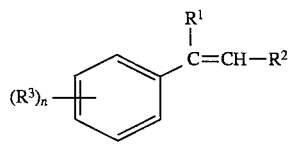

I where $R^1$, $R^2$ and $R^3$ are each hydrogen, methyl or ethyl and n is 1 or 2, or of a $C_2$–$C_{10}$-olefin having one or two conjugated double bonds, or of a mixture thereof, (b) from 0 to 40% by weight of a $C_1$–$C_{12}$-alkyl ester of acrylic or methacrylic acid, acrylonitrile, methacrylonitrile, acrylamide or methacrylamide which may be substituted by one or two $C_1$–$C_4$-alkyl groups on the amide nitrogen, maleic anhydride or maleimide which may be substituted by $C_1$–$C_4$-alkyl on the imide nitrogen, or a mixture thereof, (c) from 0 to 20% by weight of one or more hydroxyl-containing acrylic or methacrylic acid derivatives, and (d) from 0 to 2% by weight of one or more poly-olefinically unsaturated monomers, to give a prepolymer A, the hydroxyl groups being incorporated in A by using hydroxyl-containing regulators if monomer component (c) is absent, and subsequently (2) a polycondensation of a mixture of A) from 5 to 95% by weight of the prepolymer A, B) from 0 to 95% by weight of a further low molecular weight or higher molecular weight polyol, of a polyester or of a polyamide or a mixture thereof and C) from 5 to 70% by weight of one or more aliphatic or aromatic dicarboxylic acids C or $C_1$–$C_4$-alkyl esters thereof, where carboxylic acids or $C_1$–$C_4$-alkyl esters thereof having more than two carboxyl groups in the molecule or monocarboxylic acids or $C_1$–$C_4$-alkyl esters thereof or hydroxymonocarboxylic acids or $C_1$–$C_4$-alkyl esters thereof, or a mixture of these, and waxes may also be present in the polycondensation, are carried out.

The novel polyester resins are very useful as binders for electrophotographic toners.

Thus, the present invention also relates to electrophotographic toners which contain, as binders, one or more novel polyester resins in the conventional amounts.

Electrophotographic toners are prepared from the novel polyester resins, for example, by milling the resin to a particle size of less than 1 mm, mixing it with carbon black, a magnetic pigment or a colorant, wax, if necessary a cobinder, such as a copolymer of styrene and an acrylic acid derivative or of styrene and butadiene or a polyester resin, Aerosil and a charge stabilizer, kneading this mixture to a uniform mass and then milling the latter to a particle size of from 5 to 15 µm and coating it with Aerosil in a fluid mixer.

If the toner composition also lacks certain assistants required for use in the copiers, or if they are not yet in their final physical form, the term pseudotoners is also used.

The novel polyester resins are mixtures of various species of macromolecules having different average molecular weights. Since it is desirable to have toner resins with a very broad molecular weight distribution, the presence of such a mixture is partly responsible for the advantageous behavior of the novel polyester resins. Rheological tests show them to have a structurally viscous behavior.

The novel polyester resins can be prepared reproducibly and without problems; in particular, the danger of uncontrollable crosslinking in the reaction vessel is substantially ruled out. They have good dispersing properties for carbon black, colorants, ferrites or other finely divided magnetic materials, Aerosil, charge stabilizers and waxes. They are readily millable in a reverse-jet mill and their throughput here is higher than in the case of comparable prior art resins and their content of fine dust is very low.

The novel polyester resins have a substantially lower electrostatic chargeability compared with the prior art media, for example the resins (1). This property considerably facilitates charge stabilization of the toners which can be prepared using the novel polyester resins.

Toners obtained from the novel polyester resins have a long shelf life, are insensitive to moisture and exhibit good cold and hot offset properties in conjunction with a high fixing rate. Copies produced using a toner obtained from this resin have uniform blackness in the solid area and no background in unprinted areas and are fast to migration. Migration in this context means the detachment of toner particles from the copy by films, for example transparent folders.

EXAMPLES

Parts and percentages are by weight, unless stated otherwise.

Preparation of prepolymer A

EXAMPLES 1 TO 7 (Suspension polymerization)

300.0 g of monomer mixture (cf. Table 1), 0.6 g of polyvinylpyrrolidone, 12.0 g of benzoyl peroxide (75% strength in $H_2O$) and 600 ml of water were stirred at from 80° to 90° C. The suspension polymers 1 to 7 were obtained (cf. Table 1).

TABLE 1

OH-functionalized styrene/acrylate copolymers by suspension polymerization (S = styrene, BA = n-butyl acrylate, BDA = 1,4-butanediol monoacrylate, HEA = 2-hydroxyethyl acrylate)

| Example No. | S [%] | BA [%] | BDA [%] | OH number [mg KOH/g] | Glass transition temp. TG [°C.] |
|---|---|---|---|---|---|
| 1 | 85.0 | 0 | 15.0 | 58.45 | 81 |
| 2 | 79.6 | 19.9 | 0.5 | 1.95 | 65 |
| 3 | 78.8 | 19.7 | 1.5 | 5.84 | 62 |
| 4 | 78.4 | 19.6 | 2.0 | 7.80 | 64 |
| 5 | 69.0 | 29.0 | 2.0 | 7.80 | 49 |
| 6 | 65.5 | 32.5 | 2.0 | 7.80 | 44 |
| 7 | 78.7 | 19.7 | 1.6 | 7.80 | 65 |

The OH numbers were calculated.

EXAMPLES 8 TO 18

(Suspension polymerization)

1,300 g of monomer mixture (cf. Table 2), 0.75 g of polyvinylpyrrolidone, 5.0 g of benzoyl peroxide (75% strength in $H_2O$) and 1,000 ml of water were stirred at from 80° to 90° C. The suspension polymers 8 to 18 were obtained (cf. Table 2).

TABLE 2

OH-funtionalized styrene/methacrylate copolymers, some of which are crosslinked, by suspension polymerization (S = styrene, BMA – n-butyl methacrylate, HEA = 2-hydroxyethyl acrylate, DVB = divinylbenzene)

| Example No. | S [%] | BMA [%] | HEA [%] | DVB [%] | OH number [mg KOH/g] | Glass transition temp. TG [°C.] |
|---|---|---|---|---|---|---|
| 8 | 79.0 | 19.0 | 2.0 | — | 9.7 | 80 |
| 9 | 78.0 | 18.0 | 4.0 | — | 19.3 | 80 |
| 10 | 77.0 | 17.0 | 6.0 | — | 29.0 | 78 |
| 11 | 76.0 | 16.0 | 8.0 | — | 38.7 | 75 |
| 12 | 75.0 | 15.0 | 10.0 | — | 48.4 | 80 |
| 13 | 76.8 | 17.0 | 6.0 | 0.20 | 29 | 80 |
| 14 | 76.9 | 17.0 | 6.0 | 0.10 | 29 | 80 |
| 15 | 76.94 | 17.0 | 6.0 | 0.06 | 29 | 82 |
| 16 | 76.95 | 17.0 | 6.0 | 0.05 | 29 | 82 |
| 17 | 76.97 | 17.0 | 6.0 | 0.03 | 29 | 79 |
| 18 | 76.99 | 17.0 | 6.0 | 0.01 | 29 | 80 |

The OH numbers were calculated; measured OH numbers for Examples 8/9/12/16: 3/6/14/8.

EXAMPLES 19 TO 22 (Solution polymerization)

A solution of 480 g of the monomer mixture, 19.2 g of benzoyl peroxide (75% strength in $H_2O$) and 48 g of toluene was added dropwise to 120 g of monomer mixture (of. Table 3), 4.8 g of benzoyl peroxide (75% strength in $H_2O$) and 12 g of toluene while stirring at 90° C. in the course of 2 hours, stirring was continued for 1 hour at from 90° to 100° C. and a solution of 6.0 g of benzoyl peroxide (75% strength in $H_2O$) in 140 g of toluene was added dropwise while stirring in the course of 1 hour. After 5 hours at 100° C. an about 65% strength solution of the polymer in toluene was obtained.

TABLE 3

OH-functionalized styrene/acrylate copolymers by solution polymerization (S = styrene, BA = n-butyl acrylate, HEA = 2-hydroxyethyl acrylate)

| Example No. | S [%] | BA [%] | HEA [%] | OH number [mg KOH/g] | Glass transition temp. TG [°C.] |
|---|---|---|---|---|---|
| 19 | 79.6 | 20.0 | 0.4 | 1.91 | 70 |
| 20 | 79.3 | 19.9 | 0.8 | 3.87 | 70 |
| 21 | 79.0 | 19.8 | 1.2 | 5.78 | 70 |
| 22 | 78.7 | 19.7 | 1.6 | 7.80 | 70 |

The OH numbers were calculated.

EXAMPLE 23

(Solution polymerization using a crosslinking agent)

400 g of toluene were initially taken and heated to the boil. A mixture of 1,659.0 g (78.95%) of styrene, 399.0 g (19.0%) of n-butyl methacrylate, 42.0 g (2.0 g) of butanediol monoacrylate and 1.1 g (0.05%) of divinyl-benzene in 200 g of toluene and simultaneously a solution of 25.2 g of tert-butyl perbenzoate in 240 g of toluene were added dropwise in the course of three hours at a rate such that the temperature did not exceed 120° C. After the reaction had continued for a further hour at the boiling point, 6.3 g of tert-butyl perbenzoate in 600 g of toluene were added dropwise in the course of one hour. The reaction was allowed to continue for a further three hours, after which the mixture was cooled to room temperature. The solution polymer obtained had a calculated OH number of 8 and a glass transition temperature TG of 81° C.

EXAMPLES 24 TO 28

(Solution polymerization using a regulator)

A solution of 240 g of the monomer mixture, 9.6 g of benzoyl peroxide (75% strength in $H_2O$) and 48 g of toluene was added dropwise to 60 g of monomer mixture (cf. Table 4), 2.4 g of benzoyl peroxide (75% strength in $H_2O$) and 12 g of toluene while stirring at 90° C. in the course of 2 hours, stirring was continued for 1 hour at from 90° to 100° C. and a solution of 3.0 g of benzoyl peroxide (75% strength in $H_2O$) in 70 ml of toluene was added dropwise while stirring in the course of 1 hour. After 5 hours at 100° C., an about 65% strength solution of the polymer in toluene was obtained.

TABLE 4

OH-functionalized styrene/acrylate copolymers by solution polymerization using a regulator (S = styrene, BA = n-butyl acrylate, ME = 2-mercaptoethanol)

| Example No. | S [%] | BA [%] | ME [%] | OH number [mg KOH/g] |
|---|---|---|---|---|
| 24 | 70 | 30 | 0.3 | 2.14 |
| 25 | 70 | 30 | 0.6 | 4.28 |
| 26 | 70 | 30 | 1.2 | 8.51 |
| 27 | 70 | 30 | 2.0 | 14.08 |
| 28 | 65 | 35 | 2.0 | 14.08 |

The OH numbers were calculated.

EXAMPLES 29 TO 32 (Block polymerization)

Examples 29 to 32 were carried out similarly to Examples 19 to 22 by omitting the solvent.

480 g of the particular monomer mixture and 24.0 g of tert-butyl peroctanoate were simultaneously added dropwise to 120 g of monomer mixture (cf. Table 3) while stirring at 120° C. in the course of 5 hours, stirring was continued for 1 hour at from 90° to 100° C. and 6.0 g of tert-butyl peroctanoate were added dropwise while stirring in the course of 1 hour. After 5 hours at 100° C., a slightly turbid melt of the polymer was obtained.

Preparation of the polyester resins

EXAMPLES 33 TO 39

207.0 g of 1,6-hexanediol, 290.7 g of terephthalic acid and 2.24 g of dibutyltin oxide were heated to 250° C. while stirring; water was distilled off until an acid number of about 90 mg of KOH/g had been reached. Thereafter, 1050.9 g of a suspension polymer from Examples 1 to 7 were added, and water was distilled off while stirring at 260° C. until a viscosity of the reaction mixture increased sharply and as far as possible an acid number of less than 25 mg of KOH/g had been reached. Table 5 shows the results of the experiments.

TABLE 5

| Example No. | Prepolymer A from Example No. | Acid number AN [mg KOH/g] | Glass transition temp. TG [°C.] | Softening point SP [°C.] | Crosslinking time a) [h] |
|---|---|---|---|---|---|
| 33 | 1 | 108 | — | — | No crosslinking after 3 h |
| 34 | 2 | 25 | 65 | 130 | No crosslinking after 3 h |
| 35 | 3 | 25 | 61 | 133 | No crosslinking after 3 h |
| 36 | 4 | 24 | 65 | 140 | No crosslinking after 3 h |
| 37 | 5 | 35 | 50 | — | 1.0 |
| 38 | 6 | — | — | — | 0.5 |
| 39 | 7 | 24 | 61 | 137 | No crosslinking after 3 h b) |

The acid numbers were determined by titration.
a) Time between addition of A and crosslinking or dramatic increase in viscosity
b) At AN = 103 mg of KOH/g, 18.2 g of octadecanol were added.

EXAMPLES 40 TO 52

Bisphenol A ethoxylated doubly and symmetrically, dimethyl terephthalate, dibutyltin oxide (0.15%, based on the total amount) and a styrene methacrylate containing hydroxyl functional groups, according to Examples 8 to 18, were heated in the presence of 100 g of toluene and, after the mixture had begun to melt, the stirrer was switched on at 40 rpm. The mixture was then heated to 200° C. (internal temperature) and methanol was distilled off until the viscosity of the reaction mixture increased sharply. The change in the viscosity with time was monitored by the torque of the stirrer. The curve leveled off increasingly as the reaction proceeded and finally no longer had any slope, making it possible to determine the end point of the reaction. After the toluene had been distilled off, the product was discharged into a tin can and then mechanically communited. The fist-sized fragments were milled in a cutting mill to particle sizes of from one to two millimetres. Table 6 shows the results of the tests.

TABLE 6

| Example No. | Bis-A [g] | TDM [g] | Prepolymer A from Expl. No. [g] | Reaction time [h] | Glass transition temp. TG [°C.] | Softening point SP [°C.] |
| --- | --- | --- | --- | --- | --- | --- |
| 40 | 347.6 | 174.8 | 8 | 1042.1 | 15.5 | 61116 |
| 41 | 293.6 | 184.5 | 9 | 1041.4 | 13.0 | 66120 |
| 42 | 237.3 | 203.9 | 10 | 1041.4 | 4.25 | 56126 |
| 43 | 206.4 | 194.2 | 11 | 1041.4 | 8.25 | 59127 |
| 44 | 127.7 | 174.8 | 12 | 1041.4 | 9.0 | 55119 |
| 45 | 297.0 | 271.8 | 13 | 1041.4 | 1.5 | 50128 |
| 46 | 233.8 | 194.2 | 14 | 1041.4 | 2.0 | 53129 |
| 47 | 233.8 | 194.2 | 15 | 642.5 | 1.75 | 54126 |
| 48 | 290.9 | 194.2 | 16 | 318.0 | 4.75 | 63120 |
| 49 | 285.2 | 194.2 | 16 | 390.3 | 6.5 | 558109 |
| 50 | 276.3 | 194.2 | 16 | 503.0 | 5.5 | 63134 |
| 51 | 233.8 | 194.2 | 17 | 1041.4 | 3.25 | 55127 |
| 52 | 288.6 | 194.2 | 18 | 1041.4 | 5.75 | 57127 |

(Bis-A = Bisphenol A ethoxylated doubly and symmetrically, TDM = Dimethyl terephthalate)

EXAMPLES 53 TO 56

207.0 g of 1,6-hexanediol, 290.7 g of terephthalic acid, 2.24 g of dibutyltin oxide and 972.1 g of a solution polymer from Examples 19 to 22 (in the form of an about 65% strength solution in toluene) were heated while stirring, toluene was distilled off, the mixture was then heated to 260° C. and water was distilled off until the viscosity of the reaction mixture increased sharply and as far as possible an acid number of less than 45 mg of KOH/g had been reached. Table 7 shows the results of the experiments.

TABLE 7

| Example No. | Prepolymer A from Example No. | Acid number AN [mg KOH/g] | Glass transition temp. TG [°C.] | Softening point SP [°C.] | Crosslinking time a) [h] |
| --- | --- | --- | --- | --- | --- |
| 53 | 19 | 32 | 53 | 123 | No crosslinking after 3 h |
| 54 | 20 | 38 | 51 | 126 | No crosslinking after 3 h |
| 55 | 21 | 41 | 50 | 157 | No crosslinking after 3 h |
| 56 | 22 | 45 | 52 | >200 | No crosslinking after 3 h |

The acid numbers were determined by titration.
a) Time between addition of A and crosslinking or dramatic increase in viscosity

EXAMPLES 57 TO 60

207.0 g of 1,6-hexanediol, 290.7 g of terephthalic acid, 2.24 g of dibutyltin oxide and 248.9 g of a solution polymer from Examples 19 to 22 (in the form of an about 65% strength solution in toluene) were heated while stirring, toluene was distilled off, the mixture was then heated to 260° C. and water was distilled off until the viscosity of the reaction mixture increased sharply and as far as possible an acid number of less than 100 mg of KOH/g had been reached. Table 8 shows the results of the experiments.

TABLE 8

| Example No. | Prepolymer A from Example No. | Acid number AN [mg KOH/g] | Glass transition temp. TG [°C.] | Softening point SP [°C.] | Crosslinking time a) [h] |
| --- | --- | --- | --- | --- | --- |
| 57 | 19 | 102 | 57 | 138 | 1.0 |
| 58 | 20 | 98 | 59 | 163 | 1.5 |
| 59 | 21 | 41 | 50 | 157 | 1.0 |
| 60 | 22 | 90 | 58 | 144 | No crosslinking after 3 h |

TABLE 8-continued

| Example No. | Prepolymer A from Example No. | Acid number AN [mg KOH/g] | Glass transition temp. TG [°C.] | Softening point SP [°C.] | Crosslinking time a) [h] |
|---|---|---|---|---|---|

The acid numbers were determined by titration.
a) Time between addition of A and crosslinking or dramatic increase in viscosity

EXAMPLES 61 TO 64

554.3 g of bisphenol A ethoxylated doubly and symmetrically to a degree of 90%, 290.7 g of terephthalic acid, 3.91 g of dibutyltin oxide and 1745.1 g of a solution polymer from Examples 19 to 22 (in the form of an about 65% strength solution in toluene) were heated while stirring, toluene was distilled off, the mixture was then heated to 260° C. and water was distilled off until the viscosity of the reaction mixture increased sharply and an acid number of less than 25 mg of KOH/g had been reached. Table 9 shows the results of the experiments.

EXAMPLE 65

182.5 g of a bisphenol A doubly and symmetrically ethoxylated to a degree of 90%, 397.3 g of bisphenol A doubly and symmetrically propoxylated to a degree of 95%, 290.7 g of terephthalic acid, 3.91 g of dibutyltin oxide and 1745.1 g of the solution polymer from Example 19 (in the form of an about 65% strength solution in toluene) were heated while stirring, toluene was distilled off, the mixture was then heated to 260° C. and water was distilled off until the viscosity of the reaction mixture increased sharply and an acid number of less than 25 mg of KOH/g had been reached. Table 9 shows the result of this experiment.

TABLE 9

| Example No. | Prepolymer A from Example No. | Acid number AN [mg KOH/g] | Glass transition temp. TG [°C.] | Softening point SP [°C.] | Crosslinking time a) [h] |
|---|---|---|---|---|---|
| 61 | 19 | 8 | 65 | 126 | No crosslinking after 3 h |
| 62 | 20 | 5 | 63 | >200 | 1.75 |
| 63 | 21 | 6 | 63 | >200 | 1.27 |
| 64 | 22 | 13 | 69 | 131 | 1.0 |
| 65 | 19 | 7 | 68 | 136 | No crosslinking after 3 h |

The acid numbers were determined by titration.
a) Time between addition of A and crosslinking or dramatic increase in viscosity

EXAMPLES 66 TO 69

554.3 g of bisphenol A ethoxylated doubly and symmetrically to a degree of 90%, 290.7 g of terephthalic acid, 3.91 g of dibutyltin oxide and 422.5 g of a solution polymer from Examples 10 to 22 (in the form of an about 65% strength solution in toluene) were heated while stirring, toluene was distilled off, the mixture was then heated to 260° C. and water was distilled off until the viscosity of the reaction mixture increased sharply and an acid number of less than 25 mg of KOH/g had been reached. Table 10 shows the results of the experiments.

TABLE 10

| Example No. | Prepolymer A from Example No. | Acid number AN [mg KOH/g] | Glass transition temp. TG [°C.] | Softening point SP [°C.] | Crosslinking time a) [h] |
|---|---|---|---|---|---|
| 66 | 19 | 10 | 78 | — | No crosslinking after 3 h |

TABLE 10-continued

| Example No. | Prepolymer A from Example No. | Acid number AN [mg KOH/g] | Glass transition temp. TG [°C.] | Softening point SP [°C.] | Crosslinking time a) [h] |
|---|---|---|---|---|---|
| 67 | 20 | 13 | 69 | 114 | No crosslinking after 3 h |
| 68 | 21 | 14 | 69 | 131 | No crosslinking after 3 h |
| 69 | 22 | 15 | 68 | 136 | No crosslinking after 3 h |

The acid numbers were determined by titration.
a) Time between addition of A and crosslinking or dramatic increase in viscosity

EXAMPLE 70

A polyester having a glass transition temperature TG of 62° C. and a softening point SP of 135° C. was prepared similarly to Examples 40 to 52 from 305.1 g of a bisphenol A ethoxylated doubly and symmetrically, 194.2 g of dimethyhl terephthalate, 1.5 g of titanium butoxylate and 714 g of the prepolymer A from Example 23 (70% strength solution in toluene).

EXAMPLES 71 TO 75

554.3 g of bisphenol A ethoxylated doubly and symmetrically to a degree of 90%, 290.7 g of terephthalic acid, 3.91 g of dibutyltin oxide and 1745.1 g of a solution polymer from Examples 24 to 28 (in the form of an about 65% strength solution in toluene) were heated while stirring, toluene was distilled off, the mixture was then heated to 260° C. and water was distilled off until the viscosity of the reaction mixture increased sharply and an acid number of less than 25 mg of KOH/g had been reached. The resins obtained had essentially the same characteristics as the products of Examples 61 to 65.

COMPARATIVE EXAMPLE A

A polyester resin was prepared according to (1) from a doubly and symmetrically ethoxylated hisphenol A, a doubly and symmetrically propoxylated bisphenol A, terephthalic acid and trimellitic anhydride as the main components. The resin thus prepared had an acid number of 19 mg of KOH/g, a glass transition temperature TG of 68° C. and a softening point of 148° C.

Preparation of pseudotoners

EXAMPLES 76 TO 78 AND COMPARATIVE EXAMPLE B 100 g of each polyester resin, prepared according to Examples 61, 65 and 66, were headed in a Jahnke & Kunkel laboratory kneader, initially at 150° C. 5 g of carbon black (Mogul®L from Cabot) were added and kneading was then carried out for 3 hours, the temperature gradually being reduced to 90° C. Every 0.5 hour, small samples were taken from the kneader and their fine distribution was visually assessed under an optical microscope at about 700 times magnification. After 3 hours, particle size distribution in the resin was very good (< 1 μm) to acceptable.

The pseudotoners were each brought to a particle size of from 5 to 15 μm by milling in a reverse-jet mill from Alpine, Type AFG (6 bar nitrogen, speed of classifier wheel 8000 rpm).

For comparison, a pseudotoner having the resin from Comparative Example A was prepared similarly by heading and milling. This pseudotoner served as Comparative Example B.

The data for all 4 pseudotoners are summarized in Table 11.

To test the incorporation characteristics of color pigments, 40 g of Pigment Red 81:1 (Fanal Pink S 4830), as a pigment powder, were headed with 60 g of the stated polyester resins and comparative resin A, and the fine distribution was investigated. These data too are shown in Table 11. No tests were carried out on the electrostatic chargeability of these pseudotoners. Performance characteristics of the pseudotoner from Examples 76 to 78 and of Comparative Example B A strip of copy paper about 40 cm long was dusted with each of the toner powders of Experiments 76 to 78 along the length, covered with an untreated paper strip and uniformly loaded with 1.5 kg for about 5 seconds on a Kofler bench (from 50° to 270° C.). For comparison, the pseudotoner B described above was tested similarly. The temperature for fixing on paper was determined by rubbing with the finger, Tesafilm® and an eraser. The temperature at the beginning of fixing and the temperature for complete fixing were determined. The pseudotoner of Examples 76 to 78 showed good fixing behavior which was similar to that of the pseudotoner of Comparative Experiment B. The performance characteristics of the pseudotoners are summarized in Table 11. The electrostatic chargeability of the pseudotoners of Examples 50 to 52 is substantially lower than that of comparative toner B.

TABLE 11

| Example No. | Resin from Example No. | Fine distribution with Carbon black | Fine distribution with Pigment Red 81:1 | Mill-ability | Electrostatic chargeability (with carbon black) q/m [µC/g] | Fixing range [°C.] |
|---|---|---|---|---|---|---|
| According to the invention: | | | | | | |
| 76 | 61 | good | — | good | 14.3 | 120–160 |
| 77 | 65 | very good | very good | good | 11.8 | 110–150 |
| 78 | 66 | moderate | — | moderate | 10.5 | 125–160 |
| For comparison: | | | | | | |
| B | A | good | moderate | good | 17.5 | 130–190 |

EXAMPLE 79 AND COMPARATIVE EXAMPLE C 133 g of a polyester resin prepared according to Example 70 were headed in a Jahnke & Kunkel laboratory header at 100° C. 7 g of carbon black (Mogul L from Cabot) were added and heading was then continued for 30 hours, the temperature gradually being reduced to 70° C. Small samples were taken from the header every 0.5 h and their fine distribution was assessed visually under the optical microscope at a magnification of about 700 times. The particle size distribution in the resin was very good after 3 hours.

The pseudotoner was prepared by milling in a Jahnke & Kunkel laboratory mill and subsequent sieving through a 36 µm sieve to a particle size of <36.

For comparison, a pseudotoner was prepared in a similar manner by kneading and milling, using the resin from Comparative Example A. This served as Comparative Example C.

In Example 79, Pigment Red 81:1 was also incorporated similarly to Examples 76 to 78. For this pseudotoner, too, no tests were carried out on the electrostatic chargeability.

The data for these pseudotoners are summarized in Table 12.
Performance characteristics of the pseudotoners from Example 79 and Comparative Example C The pseudotoners of Example 79 and Comparative Example C were also tested similarly to the fixing test on the pseudotoners, described in Examples 76 to 78. The pseudotoner of Example 79 exhibited substantially lower electrostatic charging than Comparative Example C.

The results of the electrostatic chargeability show that the novel resins are negatively charged to a substantially smaller extent. The better fine distributions with carbon black and in particular Pigment Red 81:1 in the case of the novel resins in contrast to the comparison resin are also striking. Furthermore, the lower fixing temperature of the novel pseudotoners in contrast to the comparative pseudotoner indicates the superiority of the novel agents.

We claim:

1. A polyester resin based on hydroxyl-containing prepolymers of olefinically unsaturated monomers, obtained by
   (1) polymerization of a mixture of
      (a) from 60 to 90% by weight of styrene or of a styrene derivative of the formula I

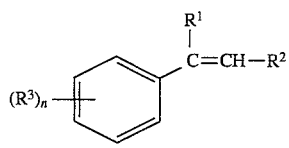

where $R^1$, $R^2$ and $R^3$ are each hydrogen, methyl or ethyl and n is 1 or 2, or of a $C_2$–$C_{10}$-olefin having one or two conjugated double bonds, or of a mixture thereof,
      (b) from 0 to 40% by weight of a $C_1$–$C_{12}$-alkyl ester of acrylic or methacrylic acid, acrylonitrile or methacrylonitrile, acrylamide or methacrylamide which may be substituted by one or two $C_1$–$C_4$-alkyl groups on the amide nitrogen, maleic anhydride or maleimide which may be substituted by $C_1$–$C_4$-alkyl on the imide nitrogen, or a mixture thereof,
      (c) from 0 to 20% by weight of one or more monomers selected from the group consisting of hydroxy-

TABLE 12

| Example No. | Resin from Example No. | Fine distribution with carbon black | Pigment Red 81:1 | Mill-ability | Electrostatic chargeability (with carbon black) q/m [µC/g] | Fixing range [°C.] |
|---|---|---|---|---|---|---|
| According to the invention: | | | | | | |
| 79 | 70 | very good | very good | very good | +0.2 (a) −2.7 (b) | 105–135 |
| For comparison: | | | | | | |
| C | A | good | — | good | −2.2 (a) −8.7 (b) | 120–155 |

(a) Measurement with a spherical uncoated steel carrier
(b) Measurement with an irregular coated steel carrier C$_2$–C$_4$-alkyl acrylates and methacrylates, N-(hydroxy-C$_2$–C$_4$-alkyl)-acrylamides and methacrylamides, N-(hydroxy-C$_2$–C$_4$-alkyl)maleimides, o-, m- and p-hydroxystyrene, o-, m- and p-(hydroxymethyl)-styrene, alkenols and mixtures thereof, and (d) from 0 to 2% by weight of one or more polyolefinically unsaturated monomers, to give a prepolymer A, having hydroxyalkyl, hydroxyphenyl or hydroxyalkenyl groups incorporated therein by using a hydroxyl-containing regulator if the monomer component (c) is absent, and subsequently (2) polycondensation of a mixture of A) from 5 to 95% by weight of the prepolymer A, B) from 0 to 95% by weight of a further polyol, of a polyester or of a polyamide or a mixture thereof and C) from 5 to 70% by weight of one or more aliphatic or aromatic dicarboxylic acids C or C$_1$–C$_4$-alkyl esters thereof, where A and B together account for from 30 to 95% by weight of this mixture, and, wherein optionally carboxylic acids or C$_1$–C$_4$-alkyl esters thereof having more than two carboxyl groups in the molecule or monocarboxylic acids or C$_1$–C$_4$-alkyl esters thereof or hydroxymonocarboxylic acids, or C$_1$–C$_4$-alkyl esters thereof, waxes, or a mixture thereof are present in the polycondensation.

2. A polyester resin as claimed in claim 1, wherein monomer (a) of polymerization (1) is a member selected from the group consisting of styrene, α-methylstyrene, ethylene, propylene, butadiene and mixtures thereof.

3. A polyester resin as claimed in claim 1, wherein monomer (b) of polymerization (1) is a member selected from the group consisting of C$_1$–C$_4$-alkyl esters of acrylic or methacrylic acid, acrylonitrile, methacrylonitrile, acrylamide, methacrylamide and mixtures thereof.

4. A polyester resin as claimed in claim 1, wherein monomer (c) of polymerization (1) is a member selected from the group consisting of hydroxy-C$_2$–C$_4$-alkyl acrylates and methacrylates, N-(hydroxy-C$_2$–C$_4$-alkyl)-acrylamides, and -methacryl-amides and mixtures thereof or, when monomer (c) is absent, a hydroxyalkyl substituted mercaptan is used as a regulator.

5. A polyester resin as claimed in claim 1, wherein monomer (d) of polymerization (1) is divinylbenzene.

6. A polyester resin as claimed in claim 1, wherein component B of polycondensation (2) is a member selected from the group consisting of C$_2$–C$_6$-alkanediols, ethoxylated bisphenol A, propoxylated bisphenol A and mixtures thereof.

7. A polyester resin as claimed in claim 1, wherein component C of polycondensation (2) is a member selected from the group consisting of phthalic acid, isophthalic acid, terephthalic acid, C$_1$–C$_4$-dialkyl esters thereof and mixtures thereof.

8. A process for the preparation of polyester resin based on hydroxyl-containing prepolymers of olefinically unsaturated monomers, comprising (1) polymerizing a mixture of (a) from 60 to 90% by weight of styrene or of a styrene derivative of the formula I

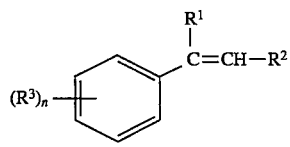

where R$^1$, R$^2$ and R$^3$ are each hydrogen, methyl or ethyl and n is 1 or 2, or of a C$_2$–C$_{10}$-olefin having one or two conjugated double bonds, or of a mixture thereof, (b) from 0 to 40% by weight of a C$_1$–C$_{12}$-alkyl ester of acrylic or methacrylic acid, acrylonitrile or methacrylonitrile, acrylamide or methacrylamide which may be substituted by one or two C$_1$–C$_4$-alkyl groups on the amide nitrogen, maleic anhydride or maleimide which may be substituted by C$_1$–C$_4$-alkyl on the imide nitrogen, or a mixture thereof, (c) from 0 to 20% by weight of one or more monomers selected from the group consisting of hydroxy-C$_2$–C$_4$-alkyl acrylates and methacrylates, N-(hydroxy-C$_2$–C$_4$-alkyl)-acrylamides and methacrylamides, N-(hydroxy-C$_2$–C$_4$-alkyl)maleimides, o-, m- and p-hydroxystyrene, o-, m- and p-(hydroxymethyl)-styrene, alkenols and mixtures thereof, and (d) from 0 to 2% by weight of one or more polyolefinically unsaturated monomers, to give a prepolymer A, having hydroxyalkyl hydroxyphenyl or hydroxyalkenyl groups incorporated therein by using a hydroxyl-containing regulator if the monomer component (c) is absent, and subsequently (2) polycondensation of a mixture of A) from 5 to 95% by weight of the prepolymer A, B) from 0 to 95% by weight of a further polyol, of a polyester or of a polyamide or a mixture thereof and C) from 5 to 70% by weight of one or more aliphatic or aromatic dicarboxylic acids C or C$_1$–C$_4$-alkyl esters thereof, where A and B together account for from 30 to 95% by weight of this mixture, and, wherein optionally carboxylic acids or C$_1$–C$_4$-alkyl esters thereof having more than two carboxyl groups in the molecule or monocarboxylic acids or C$_1$–C$_4$-alkyl esters thereof or hydroxymonocarboxylic acids, or C$_1$–C$_4$-alkyl esters thereof, waxes, or a mixture thereof are present in the polycondensation.

9. A process for the production of an electrophotographic toner, which comprises incorporating a toner into a polyester resin as claimed in claim 1 as a binder.

10. An electrophotographic toner containing, as a binder, one or more polyester resins as claimed in claim 1.

11. A polyester resin as claimed in claim 1, wherein monomer (c) is present in an amount of at least 0.4% by weight.

12. A process for the preparation of a polyester resin as claimed in claim 8, wherein monomer (c) is present in an amount of at least 0.4% by weight.

* * * * *